3,359,561
APPARATUS FOR INDICATING AND RECORDING PERIODS OF OPERATION OF A MACHINE
Robert E. Shostek, Johnstown, Pa., assignor to United States Steel Corporation, a corporation of Delaware
Continuation of application Ser. No. 186,260, Apr. 9, 1962. This application July 15, 1964, Ser. No. 384,037
3 Claims. (Cl. 346—17)

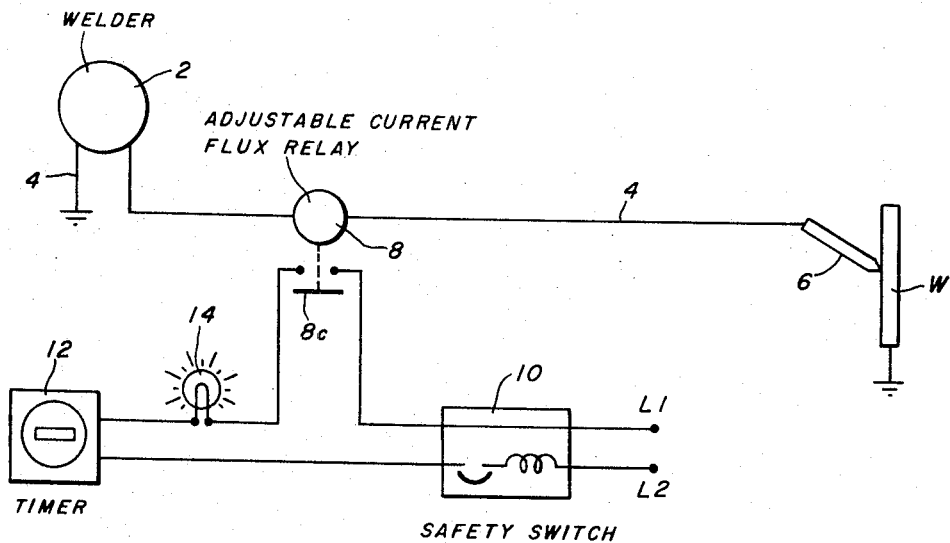

This application, which is a continuation of my copending application Ser. No. 186,260, filed Apr. 9, 1962, and now abandoned relates to apparatus for indicating and recording periods of operation of an electric powered machine and more particularly for indicating and recording the total time during which a welding device is operating and which may be used in conjunction with welding machines operated either on alternating or direct current.

Other machines with which my invention may be used include sand slingers for foundry sand and hot toppers for large steel castings. However, the invention will be described as applied to welders where it has proven highly successful. Preferably the load current should be greater than 60 amperes with the load current differing from no load current by 20 amperes. Various devices for determining welding time have been used, but all of those of which I have knowledge require both a voltage relay and a current relay. A special timer is also required for each and every type of welding unit. Welding units include various combinations of alternating current, direct current, constant voltage and variable voltage. The initial voltage drop which occurs when the welding arc is struck varies over a wide range depending upon the type of welding device used and as the device ages the voltage drop becomes greater. In conventional timers this necessitates re-arrangement of the relays to accommodate such a drop and the circuits also have to be altered to allow for increasing and decreasing voltages. Because of these variable factors the determination of working periods for man hour accounting is not dependable nor accurate. Lack of reliability in measuring man hours of welding time, incentive wage rates, etc., leads to grievances by the operators. The operators will usually discontinue welding when the device ceases to function properly and thus valuable welding time is lost while new circuits and different relays or timers are installed. Previous devices used at a specific plant having approximately 200 welding machines of all popular makes indicated that the welding machines were welding from 5½ to 6 hours in an 8 hour shift whereas the actual welding time was between 3½ and 4 hours.

It is therefore an object of my invention to provide inexpensive and reliable apparatus for indicating and recording periods of machine operation accurately.

Another object is to provide such apparatus which can be used with machines requiring direct or alternating current, constant or variable voltage, and various load currents.

Still another object is to provide such apparatus which requires only a single relay in place of two relays previously used.

These and other objects will be more apparent after referring to the following specification and attached drawing, in which:

The single figure is a schematic view of the apparatus of my invention.

Referring more particularly to the drawing, reference numeral 2 indicates an electric welder which may operate on direct or alternating current and which may operate at a constant or variable voltage. The welder 2 is connected by means of work cables 4 and electrode 6 to a workpiece W. The cable 4 passes through a flux relay 8 having a normally open contact 8C. The flux relay is a conventional device which consists of a laminated open iron core and is adjustable for operation by different currents. This may be done by varying the air gap. One such relay is manufactured by Automatic Switch Company of Florham Park, New Jersey and is shown on pages 144 and 145 of their 1957 catalogue entitled "Electromagnetic Control." Pages 144 and 145 are in Section 4, Bulletin 1054–151. The contacts 8C are connected to a 110 or 220 volt 60 cycle power source L1, L2 through a safety switch 10 in series with a timer 12. The timer is also a conventional device which indicates and records the welding time. One such timer is manufactured by Meylan Stop Watch Corporation of New York city and is shown on page 5 of their 1962 catalogue where it is identified as Series J–1824. An indicating light 14 may be arranged in parallel with the timer 12.

The operation of my device is as follows:

The flux relay 8 is adusted for operation at the desired welding current and when an arc is struck between the workpiece W and electrode 6 a magnetic field is set up around the work cable 4 which induces a corresponding magnetic field in the iron core of the flux relay 8, thus closing its contact 8C and permitting current to flow through and power the indicating light 14 and to start the motor of timer 12. When the arc of the workpiece W is broken the magnetic field around the cable 4 collapses, thus opening the contact 8C and cutting off flow of current through the timer 12 and indicating light 14. The timer scale indicates the total arc time of the actual time consumed in welding.

While one embodiment of my invention has been shown and described it will be apparent that other adaptations and modifications may be made without departing from the scope of the following claims.

I claim:

1. Apparatus for indicating and recording periods of actual operation under load of an electric powered machine having a load cable and in which a magnetic field is set up around the load cable when current passes therethrough, said apparatus comprising a flux relay through which said cable passes, said flux relay being adustable for operation by different load currents, said magnetic field inducing a corresponding magnetic field in the flux relay to energize the same, a source of electric power connected to said flux relay, and a timer connected to said source of electric power in series with said flux relay for indicating and recording operating time.

2. Apparatus for indicating and recording periods of actual operation under load of an electric powered machine having a load cable and in which a magnetic field is set up around the load cable when current passes therethrough, said apparatus comprising a flux relay through which said work cable passes, said flux relay having a normally open contact and being adjustable for operation by different load currents, said magnetic field inducing a corresponding magnetic field in the flux relay to close said contact, a source of electric power connected to said relay contact, and a timer connected to said source of electric power in series with said relay contact for indicating and recording operating time.

3. Apparatus according to claim 2 including a safety switch, and signal connected in series with said timer and relay contact, said machine being a welding machine.

References Cited

UNITED STATES PATENTS

| | | | |
|---|---|---|---|
| 2,340,114 | 1/1944 | Duis | 346—33 X |
| 2,366,548 | 1/1945 | Oestreicher et al. | 58—145 |
| 3,024,353 | 3/1962 | Brashear | 317—148 X |

RICHARD B. WILKINSON, *Primary Examiner.*

LEO SMILOW, *Examiner.*

JOSEPH W. HARTARY, *Assistant Examiner.*